United States Patent

Meola et al.

Patent Number: 6,092,464
Date of Patent: Jul. 25, 2000

[54] THREE-DIMENSIONAL RAISED IMAGE SCREEN PRINTING

[75] Inventors: Jack J. Meola, Scottsdale; Grant R. Stousland, Paradise Valley, both of Ariz.

[73] Assignee: M J Grant Company, Tempe, Ariz.

[21] Appl. No.: 09/044,611

[22] Filed: Mar. 19, 1998

[51] Int. Cl.[7] ....................................................... B41M 1/12
[52] U.S. Cl. ...................... 101/129; 101/123; 101/128.21
[58] Field of Search .................... 101/114, 115, 101/123, 124, 128.21, 128.4, 129

[56] References Cited

U.S. PATENT DOCUMENTS

| | | | |
|---|---|---|---|
| 4,499,175 | 2/1985 | Curtis et al. | 430/253 |
| 4,541,340 | 9/1985 | Peart et al. | 101/32 |
| 4,930,413 | 6/1990 | Jaffa | 101/126 |
| 5,136,938 | 8/1992 | Pellegrina | 101/115 |
| 5,138,943 | 8/1992 | Kikuchi et al. | 101/115 |
| 5,355,791 | 10/1994 | Benedetto et al. | 101/126 |
| 5,802,970 | 9/1998 | Tani | 101/123 |

*Primary Examiner*—Ren Yan
*Attorney, Agent, or Firm*—Andrus, Sceales, Starke & Sawall

[57] ABSTRACT

A method of screen printing raised three-dimensional images, for example, corporate logos, on printable textile and/or non-textile substrates involves the use of a stencil attached to the print side of the print screen. The stencil is made from a pre-fabricated, photosensitive thick film having a precision controlled thickness. The print screen is coated with a photosensitive emulsion, and the combination of the print screen and the attached photosensitive stencil blank are exposed to UV light from metal halide lamps to harden the non-exposed emulsion and stencil material. The screen and stencil are thereafter washed to remove the non-hardened emulsion and stencil material, thereby creating openings in the screen coating and stencil material to form a three-dimensional image volume. Pigmented paste is screen printed through the one or more image openings in the coated screen and the associated one or more image volumes in the stencil to form a three-dimensional image on the substrate. Complex three-dimensional images can be built using a plurality of raised image layers. The raised, three-dimensional image layers have a generally planar surface and sharp edges perpendicular to the planar surface.

35 Claims, 6 Drawing Sheets

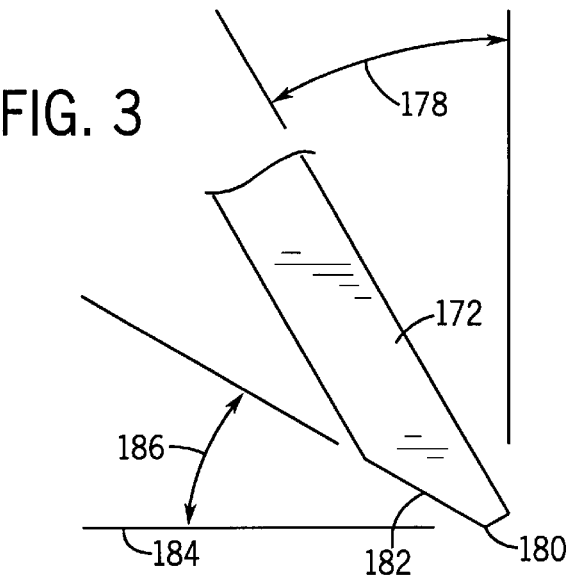
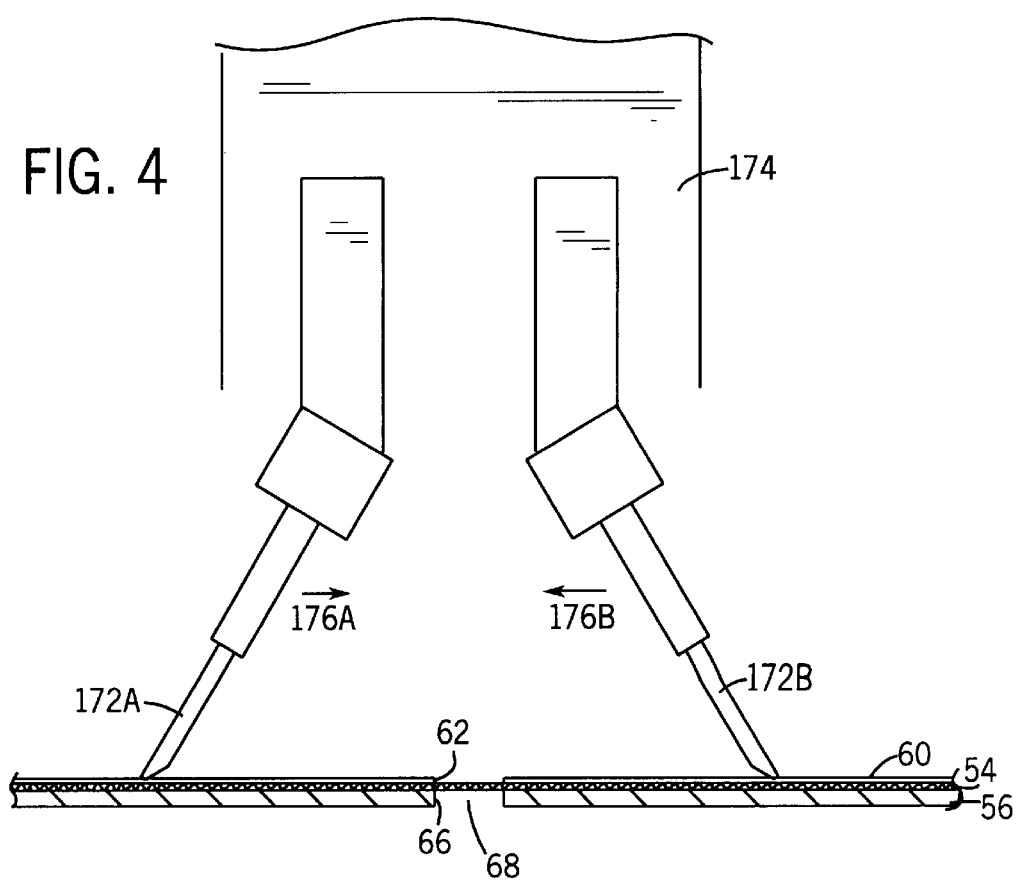

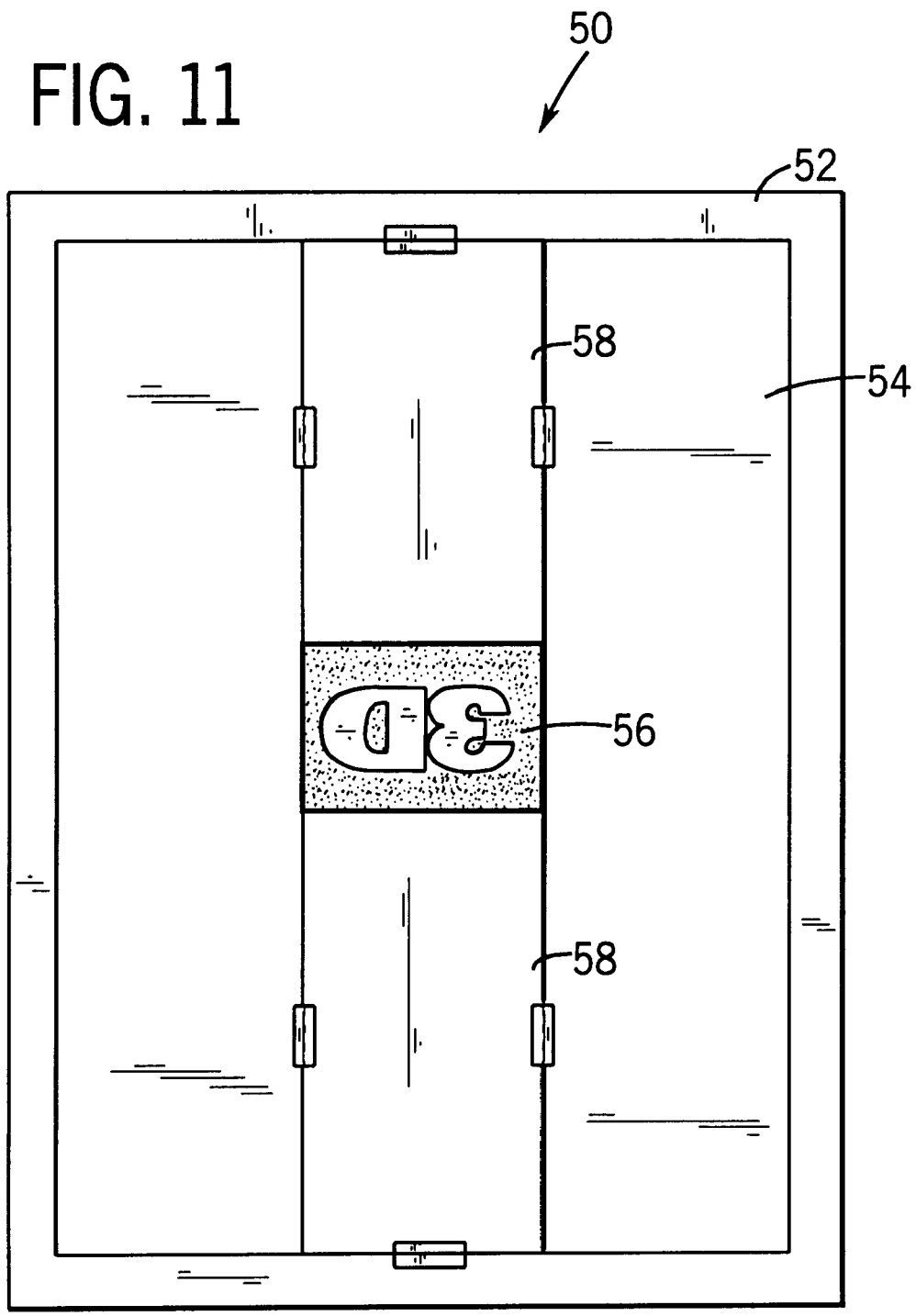

THREE-DIMENSIONAL RAISED IMAGE SCREEN PRINTING

FIELD OF THE INVENTION

The invention relates the printing of raised images, for example corporate logos, on printable substrates such as textile substrates or non-textile substrates. The invention is especially useful for screen printing raised three-dimensional images on garments, garment panels or patches.

BACKGROUND AND SUMMARY OF THE INVENTION

Corporate logos and the like are often affixed to textiles such as shirts, sweatshirts, caps, shorts, outerwear, pants, etc. Quite often, the corporate logos are screen printed on the garments. However, corporate logos on sewn-on patches or embroidered corporate logos are normally used on more expensive garments.

The invention arose during efforts by the assignee to develop practical means for screen printing raised, three-dimensional images on textile and non-textile substrates as an alternative to sewn-on patches and/or embroidery. In developing a raised image screen printing technique, it was important to develop a technique that can be used reliably on conventional production equipment such as automatic indexing screen printing machines. Such screen printing machines are typically used to print multi-colored images on substrate material such as T-shirts, sweatshirts, posters, etc. In these machines, the substrate is mounted on one of several palettes that typically extend radially from an indexed turret. The turret is then rotated to move the palettes among a plurality of print processing stations located peripherally around the turret.

In one aspect, the invention is a method of printing a raised image on a substrate, such as a garment, using an automatically indexing screen printing machine. In accordance with the invention, a prefabricated stencil is attached to a print side of the print screen used at the printing station for the raised image. The print screen is coated with an emulsion that is hardened except in one or more image areas. The stencil has a prefabricated thickness, for example, 400 microns. One or more image openings pass through the stencil. Each of the openings through the stencil has a shape corresponding to the one or more image areas passing through the hardened emulsion coating on the print screen. The one or more image openings through the stencil define one or more three-dimensional image volumes in the stencil for the form of raised image. The raised image is formed by screen printing pigmented paste through the one or more image areas of the print screen and the associated image volume in the stencil onto the substrate. Additional flat or raised layers can be printed on an initial raised image layer to create complex, colorful three-dimensional images. It is normally preferred that the initial raised image layer be heat cured before subsequent printing.

Using the above-described method, raised images having sharp and distinct resolution can be reliably and effectively printed using automatically indexing screen printing machines. Specifically, raised images can be produced having a top surface that is planar as well as peripheral edges that are substantially perpendicular to the top planar surface. In addition, subsequent raised image levels can be built on top of previous raised levels having the same or different shape to enhance image contrast as desired.

In the prior art, puffing agents have been added to ink in order to produce raised images. In puff printing, the puffing agent normally constitutes 60% to 75% by weight of the ink. When the printed substrate is processed through the dryer, the puffing agent forms a gas to raise the ink. While puff printing can provide raised images, it is difficult to print puffed images having sharp, distinct lines. Puffed images are by nature rounded. Also, it is difficult to control the precise image created by puff printing, especially when used to print rather large areas, or when layering levels of puffed printing. In many applications, such as the printing of three-dimensional corporate logos and the like, the invention as described above is far more desirable than puff printing.

The preferred photosensitive material for the stencil is a pure polymer, and the preferred photosensitive emulsion is a pure polymer emulsion that is compatible with the stencil material. The stencil blank is preferably a prefabricated pure polymer thick film having precision controlled thickness (e.g. 400 microns, 700 microns, etc.) as is sometimes used in the electronics manufacturing industry. The pure polymer stencil blank is attached to the print side of the screen using the photosensitive emulsion, and left to dry for a significant amount of time to ensure secure attachment. The print screen is then coated with the photosensitive emulsion, preferably two coats, and then left to dry. Thereafter, the film positive or image mask is placed preferably adjacent the stencil blank. The masked print screen and stencil blank are exposed to UV light from metal halide lamps to harden the exposed polymer emulsion and the exposed portion of the polymer stencil blank. The screen and stencil are then washed to remove non-hardened emulsion and stencil material preferably using water and a soft brush. Using a print screen and stencil created in the manner described can be used to produce raised images of solidified pigmented paste that exhibit unprecedented definition and resolution.

There are other aspects of the invention which facilitate effective printing of raised three-dimensional images of solidified pigmented paste. For instance, it is desirable that the squeegee or squeegees be relatively stiff, and that the lower edge of the squeegees be beveled to help push a high volume of pigmented paste through the image area in the print screen and the image volume of the stencil onto the substrate. Further, it is desirable that the print station employ two squeegees, each opposing one another. The flood squeegee forces pigmented paste into the image volume created by the stencil as the print head is moving forward during the flood stroke of the print head to fill the image volume. The print squeegee continues to push pigmented paste into the image volume and deposits the pigmented paste on the substrate during the print stroke of the print head. In some applications, it may not be necessary to use two squeegees to effectively implement the invention.

Further, the viscosity of the pigmented paste should be controlled to provide stability to the raised image before heat curing or other processing. To this end, a dry powder thickener can be added to a pigmented polyvinyl chloride resin-based ink to provide a pigmented paste having sufficient viscosity. It is also normally important that the print screen and stencil release cleanly from the three-dimensional form of pigmented paste printed onto the substrate after the print squeegee passes the image area during the print stroke. To this end, it is preferred to add a releasing agent to the pigmented paste mixture.

Other features and advantages of the invention should be apparent to those skilled in the art upon inspecting the following drawings and description thereof.

BRIEF DESCRIPTION OF THE DRAWINGS

FIG. 3 is a detailed view showing the preferred configuration of a print squeegee as used in accordance with the invention.

FIG. 4 is a schematic view illustrating the preferred configuration of the print head for a screen printing machine used to print raised images which employs the use of two opposing squeegees.

FIG. 11 is a plan view illustrating a print screen and attached stencil as well as adjacent ramps to facilitate smooth operation of the respective squeegees over the print screen.

DETAILED DESCRIPTION OF THE INVENTION

Figure 1:
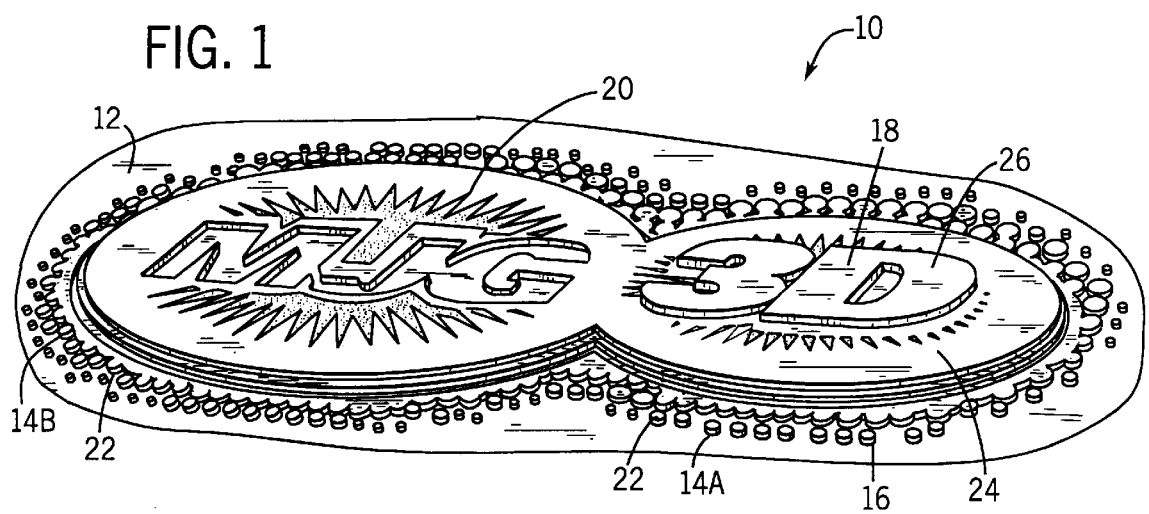
FIG. 1 is a perspective view of a three-dimensional, raised image printed on the surface of a substrate in accordance with the invention.

FIG. 1 illustrates a raised three-dimensional image 10 printed on the surface of a substrate 12 in accordance with the invention. The raised image includes three levels 14a, 14b, 16, 18, each consisting of solidified pigmented paste. Each level 14a, 14b, 16, 18 is applied separately to the substrate 12 to build a complex, three-dimensional image 10 on the substrate 12. The raised three-dimensional image 10 also includes flat image printing 20 on top of raised image layer 16.

In accordance with the invention, each raised layer 14a, 14b, 16, and 20 has a surface opposite the substrate that is generally planar and parallel to the surface of the substrate 12. For instance, raised image layer 14a, 14b has top surfaces 22 that are generally planar and parallel to the surface of the substrate 12. Likewise, raised image layer 16 has a top generally planar surface 24 that is generally parallel to the textile surface 12, and raised image level 18 has a generally planar surface 26 that is generally parallel to the textile surface 12.

In the embodiment of the invention shown in FIG. 1, the initial raised layer 14a, 14b is printed directly on the surface of the substrate 12. In many applications, the substrate 12 will be an absorbent, porous textile substrate such as a garment, a portion of a garment (i.e. a garment panel), or a patch. However, it is possible within the scope of the invention to print raised three-dimensional images such as raised image 10 on other substrates, including substrates which are used in connection with garments. Further, it has been found that raised image printing as shown and described herein can be applied to many polyester blends and/or stretchable textile products with great success.

The raised three-dimensional image 10 shown in FIG. 1 reads MJG 3D, which is a brand name used by the assignee of this application, MJ Grant Company. The brand name MJG 3D is not being used in this application in a descriptive or generic sense to explain the invention. Note that the letters MJG in FIG. 1 are essentially cut-out of the middle raised image level 16, whereas the letters 3D in FIG. 1 are formed by an additional raised level 18 placed on top of the middle raised level 16.

Figure 2:
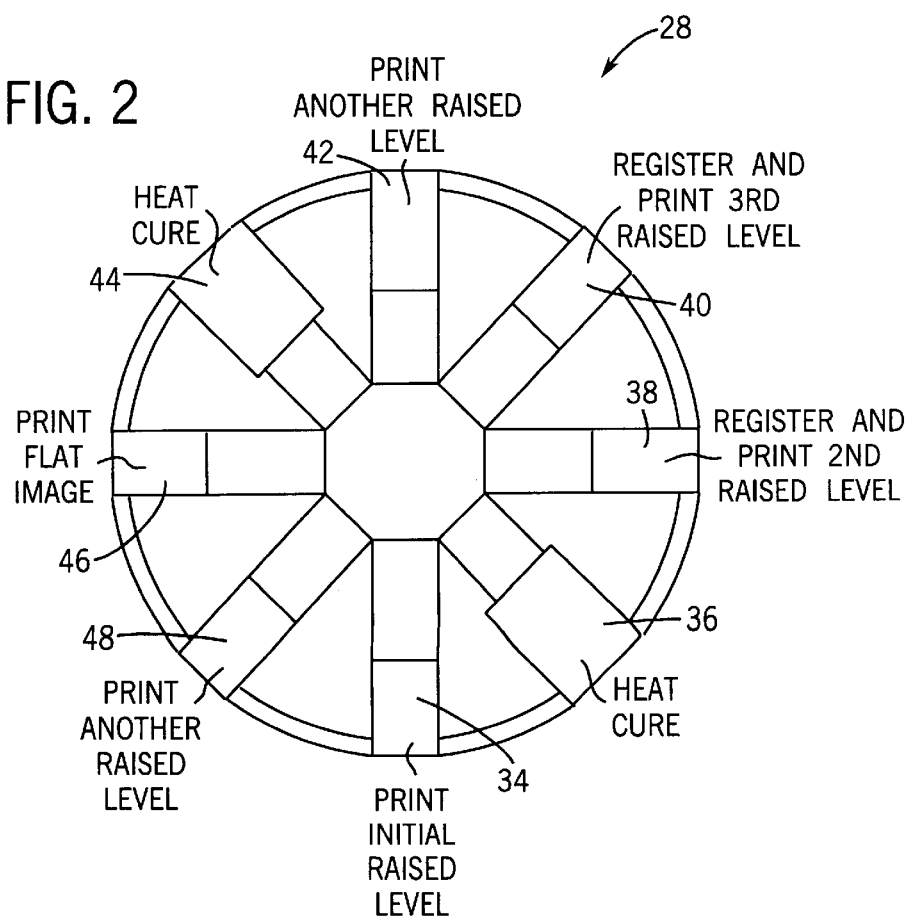
FIG. 2 is a schematic drawing of an automatically indexing screen printing machine illustrating various printing steps occurring at print processing stations on the press.

FIG. 2 is a schematic drawing illustrating an automatically indexing screen printing machine or press 28 as is conventionally used in the screen printing industry to print textiles. The screen printing machine 28 includes a series of palettes not shown specifically in FIG. 2 but represented by reference number 30 on FIGS. 5 through 8. The palettes 30 extend radially from an indexed turret 32. The turret 32 rotates to move the palettes 30 among a plurality of print processing stations 34, 36, 38, 40, 42, 44, 46, 48 which are successively located peripherally around the turret 32. Print processing stations 34, 38, 40, 46 and 48 are print head stations. Print processing stations 36 and 44 are heat curing stations in which flash units are provided to heat cure pigmented paste and/or ink before further processing on the press 28.

The press 28 shown schematically in FIG. 2 illustrates a process in which an initial raised level is printed at print station 34 on the substrate 12. The substrate 12 is then moved to heat curing station 36 to cure the initial raised level printed at print station 34. After curing, the substrate 12 is moved to print station 38 to print a second raised level. In order to build relatively tall three-dimensional images 10 with a straight peripheral edge defining the image, it is often necessary to first print the initial raised level at a first print station such as 34 in FIG. 2 and, after curing, register the image at a second print station printing the same image except thicker as represented by the explanatory text by station 38 in FIG. 2. This process is shown more specifically in FIGS. 7 and 8 and is described in more detail below. Next in FIG. 2, substrate 12 is moved to print station 40 to print a finishing layer on the raised level. The substrate 12 is then moved to another print station such as 42 to print another raised image possibly separate although not necessarily separate from the first raised image. The raised level printed at station 42 is then heat cured at station 44, and thereafter a flat image can be printed on one of the raised levels at station 46. Depending on the number of print processing stations available on the press 28, it may be desirable to print another raised level, see print processing station 48. After station 48, the substrate 12 with the images printed thereon is removed, and then dried in a conventional dryer as is known in the art.

FIG. 11 shows a print screen 50 used to print the raised image level 18 shown in FIG. 1. The print screen 50 includes a frame 52, a screen coated with a photosensitive emulsion 54 and a stencil 56. When printing textiles, a conventional screen 54 can be used to implement the invention. For example, a screen having 81 polyester threads per inch is suitable. The photosensitive emulsion coating the print screen 54 is preferably a pure polymer emulsion such as the emulsion provided by Murakami Screen Company, Monterey, Calif. under the name Murakami One Pot Sol C Emulsion. The stencil 56 is also made of a photosensitive material, preferably a pure polymer photosensitive material such as prefabricated MS Thick Film supplied by Murakami Screen Company. The prefabricated stencil material, such as that supplied from Murakami Screen Company, has a precisely controlled thickness. As disclosed in more detail with respect to FIG. 10, the photosensitive stencil material 56 is attached to the print screen 54 on the print side of the screen 54. Ramps 58 can also be attached (e.g., using tape) to the print side of the screen 54 adjacent the stencil 56. The thickness of the ramps 58 should be substantially the same as the thickness of the stencil 56. The purpose of the ramps 58 is to facilitate smooth operation of the print squeegee during the printing stroke.

Figure 6:
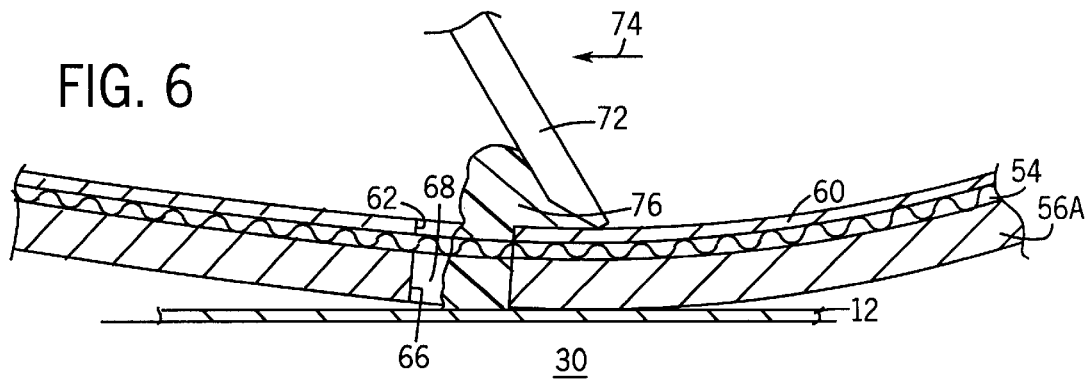
Figure 7:
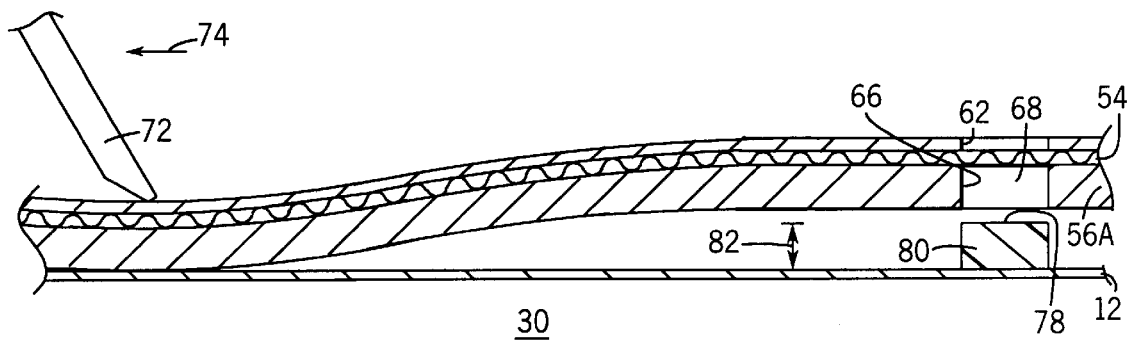
Figure 8:
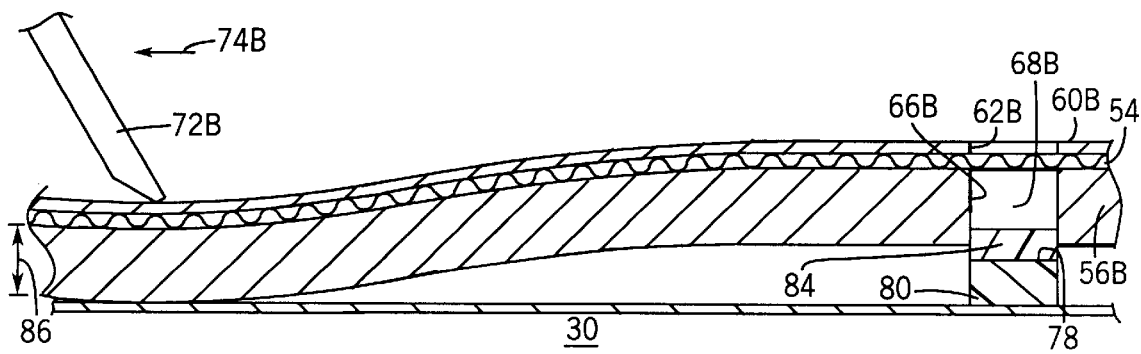

Referring now to FIGS. 5 through 8, the stencil 56 has a substantial thickness such as 400 microns in FIGS. 5 through 7 and 700 microns in FIG. 8. The hardened photosensitive emulsion coating 60 on the screen 54 has one or more image areas 62 developed therein. Preferably, the stencil 56a is preferably to the print side 64 of the print screen primarily by the bond of the emulsion 60 to the stencil 56a through the print screen 54. The stencil 56a includes one or more openings 66 therethrough having a shape corresponding to the one or more image areas 62 through the hardened emulsion coating 60 on the print screen 54. The one or more image openings 66 through the stencil 56a define one or more three-dimensional image volumes 68 with the print screen 54 forming the top surface of the image volume 68.

Figure 5:
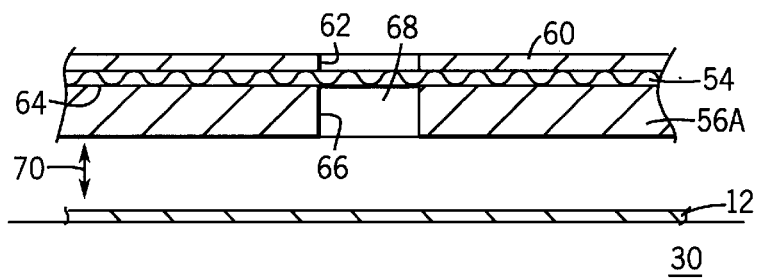
FIGS. 5 through 8 schematically illustrate the printing of pigmented paste through a print screen and attached stencil to form a raised image in accordance with the invention.

As shown in FIG. 5, the print screen 54 with the attached stencil 56a is normally off contact from the substrate 12 during the print stroke, see arrow 70, unless a print squeegee applies pressure to the screen 54. FIG. 6 shows a squeegee 72 moving in the direction of arrow 74 to apply pigmented paste 76 through the one or more image openings 62 in the hardened emulsion coating 60 on the print screen 54 and the one or more image volumes 68 in the stencil 56 onto the substrate 12 to form a three-dimensional level for a raised image on the substrate 12. The peripheral walls 66 of the opening 68 through the stencil 56a provide a three-dimensional mold for the raised image with the squeegee 72 in effect troweling the top surface 78 of the raised image level 80.

In order for the raised image level 80 to maintain the appropriate form before further processing such as heat curing, it is important that the pigmented paste have sufficient viscosity. It has been found that conventional polyvinyl chloride resinbased inks (i.e. plastisol inks) can be used to create a pigmented paste having a sufficient viscosity by adding dry thickener such as Rutland Thickener M00010 Thickener No. 10, which is a dry powder thickener. Referring to FIG. 7, it is also important that the stencil 56a and the print screen 54 release cleanly from the raised image level 80 of formed pigmented paste. To accomplish clean release, it has been found desirable in many applications to add a releasing agent to the pigmented paste mixture. A suitable releasing agent can be purchased from Rutland Plastic Technologies, Inc., for example Rutland Half Tone Base. Inasmuch as different colors of plastisol inks have substantially varying characteristics even when provided from the same manufacturer, it will normally be necessary to experiment with the amount of dry powder thickener and releasing agent necessary to add to the pigmented paste mixture to achieve superior results. Also, inasmuch as plastisol inks are thixotropic, it may be desirable to cool the ink, for example using a fan, an air bar, or other cooling means, to control the viscosity of the pigmented paste during the course of operation, as well as control other characteristics of the paste important for quality such as paste consistency and releasability.

FIG. 7 shows the squeegee 72 moving in the direction of arrow 74 after the initial raised level 80 of pigmented paste has been printed, and the screen 54 and stencil 56a have released from the formed image of pigmented paste. The thickness of the raised image, identified by arrow 82, is a matter of choice, but preferably about 300 to 500 microns. Note that the peripheral edges of the raised image 80 are substantially perpendicular to the generally planar top surface 78 of the raised image 80. In order to develop taller images, it is may be desirable to print a second image layer 84 on the top surface 78 of the initial image layer 80 as shown in FIG. 8. To accomplish this, the initial image layer 80 is registered at another print station in which a coated print screen 54b and attached stencil 56b having the same one or more images 62b, 66b therethrough are located. However, the thickness, arrow 86, of the stencil 56b in FIG. 8 is greater than the thickness 82 of the stencil 56a in FIGS. 5 through 7. Therefore, the image volume 66b in FIG. 8 is greater than the volume 68 in FIGS. 5 through 7, thereby enabling the second image level 84 to be printed on the initial image level 80 in a similar manner to that shown in FIGS. 5 through 7. As should be apparent to those skilled in the art, if the second raised image level 84 does not have the same shape as the initial raised image level 80, it may not be as critical to precisely register the stencil 56b with the initial raised image level 80 before printing the second raised image level 84.

In some designs using raised images, it may be desirable to print another raised image at a subsequent print station which is adjacent or next to a previously printed raised image, such as raised image 80 in FIG. 7. For example, this may be useful when printing two or more adjacent raised images on the substrate 12 having different colors. If the adjacent raised images are in close vicinity to one another, it may be necessary to modify the print screen 54 and stencil 56 in order to accommodate the previously printed raised image. If necessary, the stencil 56 for the later printed raised image should include volumes 68 for both the later printed raised image and also the earlier printed raised image. In this manner, the earlier printed raised image will not interfere with the stencil 56 for the later printed raised image. Also, screen filler or block-out should be used to block out the screen image areas 62 corresponding to the earlier printed raised image. The stencil 56 for the later printed raised image therefore includes blocked-out volumes to accommodate the earlier printed raised image, however, pigmented paste is prevented from penetrating into the blocked-out volumes for the previously printed raised image by the block-out on the screen 54. In order to relax the required precision for registration of the blocked-out volumes for the previously printed raised image in the stencil for the later printed raised image, it may be desirable that the blocked-out volumes be enlarged slightly to provide clearance for the previously printed raised image.

It has been found advantageous for promoting effective application of the pigmented paste onto the substrate to use two relatively stiff squeegees 172 having the mounting orientation and configuration shown explicitly in FIGS. 3 and 4. Referring in particular to FIG. 4, it is preferred to mount two (2) opposing squeegees 172a, 172b to the print head 174 for the respective printing station. When printing conventional flat images, it is typical to use a single squeegee, however, in order to facilitate the application of a sufficient amount of pigmented paste through the one or more image openings 62 in the coated print screen 54 and the one or more openings 66 in the stencil 56, it is normally desirable to use two squeegees 172a, 172b. Squeegee 172a is a flood squeegee and squeegee 172b is a print squeegee. The squeegees 172a, 172b are preferably relatively stiff squeegees, for example having a durometer in the range of 70 to 80. The primary purpose of flood squeegee 172a is to fill the image volume 68 in the stencil 56 with pigmented paste when the print head 174 is moving in the direction identified by arrow 176a (i.e. the flood stroke). During the flood stroke, the palette is positioned at a height below the normal print height as is known in the art. Also during the flood stroke, the print head 176 automatically raises the print squeegee 172b from the screen 54. The primary purpose of print squeegee 172b is: 1) to press the screen 54 and stencil 56 against the substrate 12, and 2) to apply paste through the openings 62, 66 onto the substrate 12, when the print head 174 is moving in the direction identified by arrow 176b (i.e., the print stroke). During the print stroke, the palette is positioned at the normal print height. Also during the print stroke, the print head 174 automatically raises the flood squeegee 172a from the screen 54. Relatively stiff squeegees 172a, 172b are used because it is desirable to apply relatively high printing pressure on the screen to facilitate application of a sufficient amount of pigmented paste onto the substrate 12. In addition, as shown in detail in FIG. 3, each of the squeegees 172 is preferably tilted at approximately a 30° angle with respect to a vertical plane, arrow 178 in FIG. 3. Also, the bottom longitudinal edge 180 of the squeegees preferably includes a longitudinal beveled portion 182. The preferred angle between the longitudinal beveled portion 182 and the horizontal plane 184 in which the print screen 54 generally lies is also preferably about 30°, arrow 186 in FIG. 3. The combination of the use of two squeegees 172a, 172b, as well as the stiffness and configuration of the respective squeegees 172 is selected to facilitate sufficient application of pigmented paste onto the substrate 12 as previously noted. In addition, squeegee printing pressure needs to be adjusted appropriately.

Figure 10:
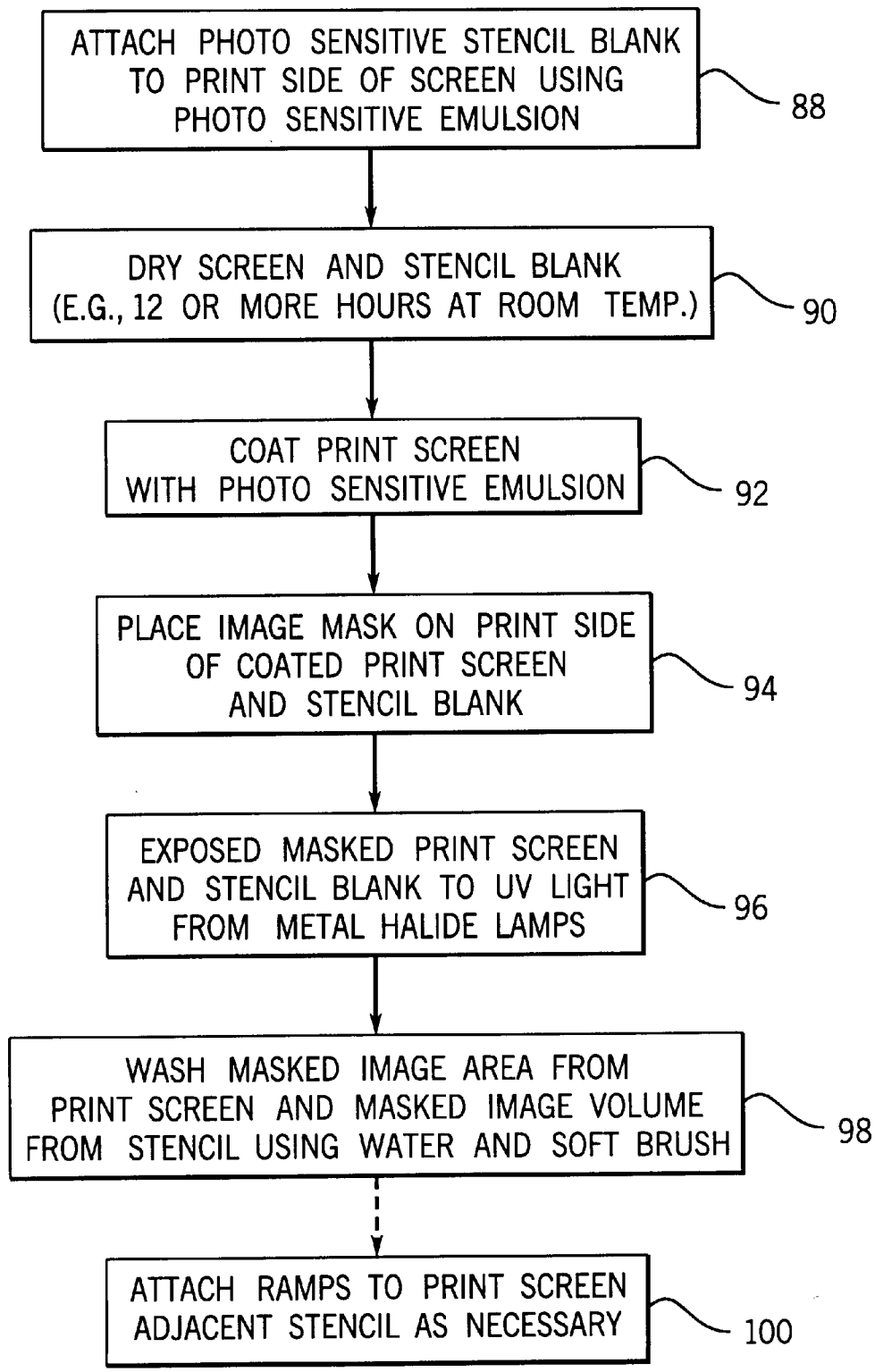
FIG. 10 is a flow diagram illustrating the steps for preparing a print screen with attached stencil in accordance with the invention.

FIG. 10 is a flow diagram illustrating the preferred manner of preparing the print screen 50 with attached stencil 56 shown in FIG. 11. The first step, block 88, is to attach the prefabricated photosensitive stencil blank 56 to the print side of the screen 54 using the photosensitive emulsion. As previously noted, the preferred stencil material is a prefabricated, pure polymer material having a precisely controlled thickness. Such materials are sometimes used in the electronics fabrication industry. As mentioned, the preferred photosensitive emulsion is a pure polymer emulsion which is compatible with the stencil material. Block 90 in FIG. 10 indicates that the screen 54 and stencil blank 56 are allowed to dry for a sufficient amount of time to ensure that the stencil blank 56 is securely attached to the screen 54. For example, it has been found that a drying time of 12 or more hours at room temperature is sufficient. The next step, block 92, is to coat the print screen 54 entirely with the photosensitive emulsion 60. Preferably, two coats are applied. After the coats of photosensitive emulsion have dried (about 2 hours), the film positive or image mask is placed over the print screen 54 and stencil blank 56, block 94. It is preferred that the image mask be placed directly on the print side of the stencil blank 56. Next, the masked print screen 54 and stencil blank 56 are exposed to UV light from metal halide lamps, block 94, to harden the exposed photosensitive emulsion and photosensitive stencil material. After exposure, the masked image area from the print screen 54 and the masked image volume from the stencil 56 are washed away using water and preferably a soft brush, block 98. Note that the exposure and washing steps 96, 98 need to be conducted carefully. If desired, ramps 58 may be attached to the print screen adjacent the stencil 56, block 100, as previously described.

Figure 9:
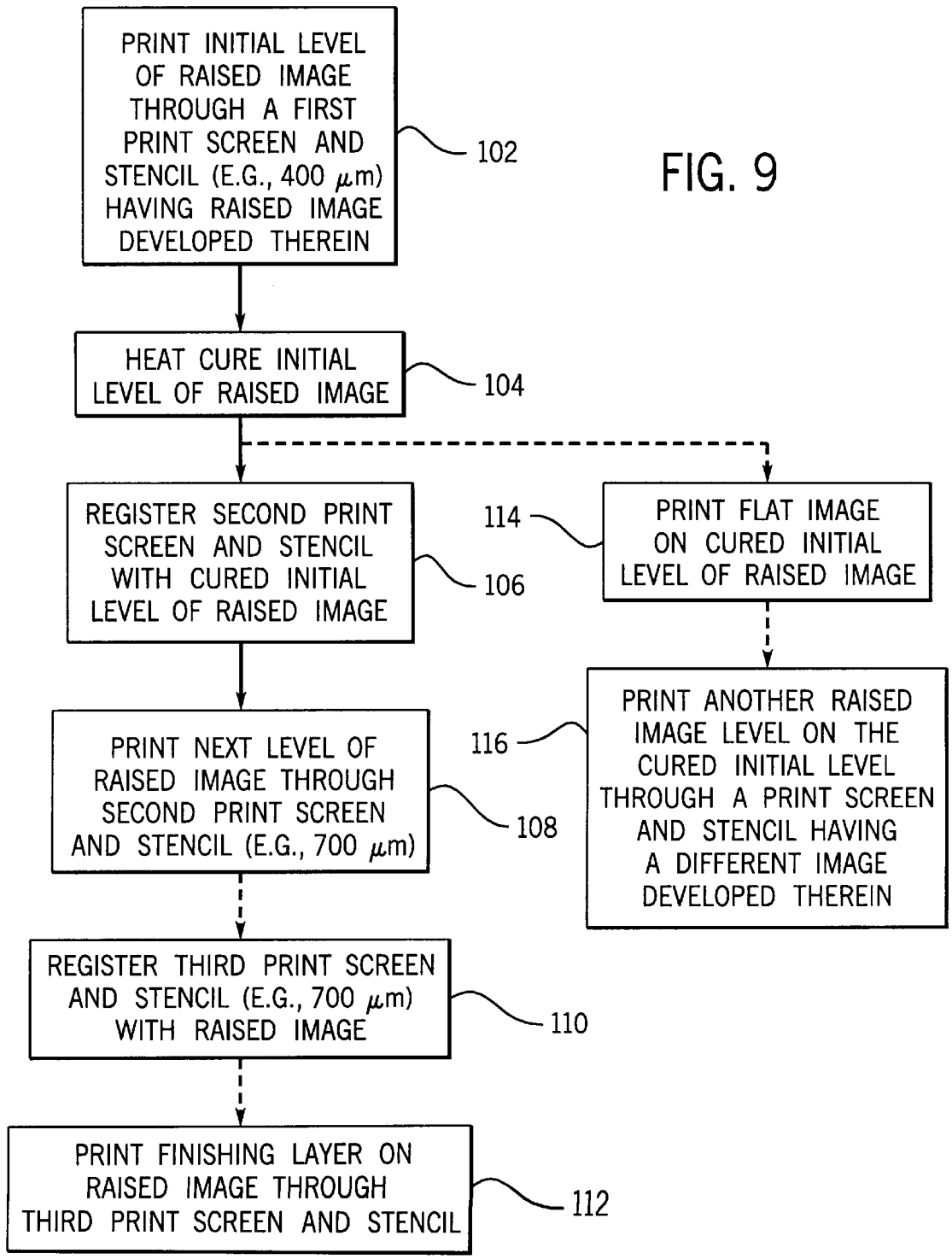
FIG. 9 is a flowchart illustrating the steps typically used when printing a raised image in accordance with the invention.

FIG. 9 illustrates exemplary steps for printing raised three-dimensional images 10 in accordance with the invention. It should be noted, however, that the method steps illustrated in FIG. 9 are in fact exemplary, and FIG. 9 is not intended to be interpreted as a means for unduly limiting the scope of the invention. Referring now in particular to FIG. 9, block 102 explains that an initial three-dimensional level of the raised image 10 of pigmented paste is printed through a first print screen and stencil having the image developed therein. Block 102 notes an exemplary thickness for the stencil of about 400 microns. It may be difficult under some circumstances to print an initial raised level thicker than 400 microns. Block 104 explains that the initial level of the raised image is heat cured before further printing or processing on the initial raised level. Blocks 106 and 108, and optionally 110 and 112, relate specifically to the printing of a second raised image level having the same shape as the initial raised image level, block 102, on top of the first raised image level. This is done to enlarge the height of the raised image. Block 106 explains that a second print screen and stencil having the same image therein are registered precisely with the heat cured initial level of the raised image. This type of registration is shown schematically in FIG. 8. Next, the second level of the raised image is printed through the print screen and stencil, block 108. The thickness for the stencil is thicker than the thickness of the stencil in block 102 for the first level of the raised image. Block 108 notes an exemplary thickness of 700 microns. Optionally, the raised image can then be registered at a third print screen and stencil having the same thickness as the previous stencil (e.g. 700 microns), block 110, to print a finishing layer on the raised image, block 112. Also, it may be desirable to add less than 20% by weight puffing agent to the pigmented paste mixture to dull the shine of the solidified three-dimensional image. Adding more than 15% to 20% puffing agent is not desirable.

Certainly, it is not always desirable to print a second level of the raised image having the same shape as the first level of the raised image on top of the first level of the raised image. For instance, block 114 illustrates that it may be desirable to print a flat image on the cured initial level of the raised image. Such a flat image is shown specifically by reference number 20 in FIG. 1. Also, it may be desirable to print another raised image level on the cured initial image level, wherein the second image level has a different shape than the first level. Such a second raised level is shown specifically by reference number 18 in FIG. 1.

Obviously, there are other combinations of flat images and raised images that may be combined in accordance with the invention to create complex or simple three-dimensional images. For instance, it is not necessary that the initial layer on the substrate be a raised three-dimensional layer when implementing the invention. The initial layer may for instance be a flat image. Also, while the invention has been explained in detail in connection with screen printing textiles, it should be apparent that many of the general concepts of the invention can be applied to screen printing non-textiles.

It should also be apparent to those skilled in the art that there are other modifications and variations of the above-described method and three-dimensional images that are not specifically described herein, but nonetheless do not depart from the true spirit of the invention. Such variations, modifications, alternatives and equivalents should be held to fall within the scope of the following claims.

We claim:

1. In an automatically indexing screen printing machine having a plurality of print processing stations and a plurality of movable palettes on which a printable textile substrate is placed, a method of printing a raised image on the textile substrate comprising the steps of:

a) providing a print screen at a first print processing station;

b) attaching a stencil to a print side of the print screen wherein the stencil is a pre-fabricated thick film having a precision controlled thickness;

c) coating the print screen with an emulsion that is hardened except in one or more image areas, wherein the stencil has one or more image openings therethrough having a shape corresponding to the one or more image areas through the hardened emulsion coating on the print screen and the one or more image openings through the stencil define one or more three-dimensional image volumes;

d) placing a textile substrate on a palette;

e) positioning the palette with the textile substrate placed thereon at the print processing station identified in step a); and f) screen printing a pigmented paste onto the textile substrate through the one or more image areas of the print screen and the one or more image volumes of the stencil to form at least part of the raised image on the textile substrate, the thickness of the raised image being at least 300 microns.

2. A method as recited in claim 1 wherein:

the print screen is coated with a photosensitive emulsion and the stencil is a photosensitive material;

the photosensitive emulsion on the print screen and the photosensitive stencil are exposed to UV light with an image mask covering the one or more image areas of the print screen and the one or more image volumes of the stencil; and thereafter the print screen and stencil are washed to remove non-hardened emulsion from the print screen corresponding to the one or more image areas and nonhardened stencil material corresponding to the one or more image volumes.

3. A method as recited in claim 2 wherein the image mask is placed directly on the stencil blank when the photosensitive emulsion on the print screen and the photosensitive stencil are exposed to UV light.

4. A method as recited in claim 1 wherein the part of the raised image recited in claim 1 is a first raised image level and the print processing station recited in step a) of claim 1 is a first print processing station, and the method further comprises the steps of:

g) providing a print screen and a stencil attached to a print side of the print screen at a second print processing station, wherein the print screen at the second print processing station is coated with an emulsion that is hardened except in one or more image areas, the stencil attached to the print screen at the second print processing station has a thickness and one or more image openings therethrough having a shape corresponding to the one or more image areas through the hardened emulsion coating on the associated print screen, the one or more image openings through the stencil defining one or more three-dimensional image volumes, the thickness of the stencil at the second print processing station being greater than the thickness of the stencil at the first print processing station, and the one or more image areas through the respective print screens being identical to one another;

h) after the first raised image level is printed on the textile substrate, positioning the palette with the textile substrate at the print processing station identified in step g), said first raised image level being in registration with the one or more image volumes on the stencil at the print processing station identified in step g); and i) screen printing a pigmented paste onto a top surface of the first raised image level on the textile substrate through the one or more image areas of the print screen and the one or more image volumes of the stencil attached to the print screen at the second print processing station to form another part of the raised image on the textile substrate.

5. A method as recited in claim 4 wherein the part of the raised image on the textile substrate printed through the print screen and stencil at the first print processing station is heat cured before printing the other part of the raised image through the print screen and attached stencil at the second print processing station.

6. A method as recited in claim 4 further comprising the steps of:

providing a print screen and a stencil attached to a print side of the print screen at a third print processing station, wherein the print screen at the third print processing station is coated with an emulsion that is hardened except for one or more image areas, the stencil attached to the print screen at the third print processing station has a thickness and one or more image openings therethrough having a shape corresponding to the one or more image areas through the hardened emulsion coating on the associated print screen, the one or more image openings through the stencil defining one or more three-dimensional image volumes, the thickness of the stencil at the third print processing station being substantially the same as the thickness of the stencil at the second print processing station, and the one or more image areas through the respective print screens being substantially identical to one another;

after the second raised level is printed on the textile substrate, positioning the palette with the substrate at the third print processing station, said first and second raised image levels being placed in registration with the one or more image volumes on the stencil at the third print processing station; and screen printing a finishing coat of pigmented paste onto the raised image through the one or more image areas of the print screen and the one or more image volumes of the attached stencil at the third print processing station.

7. A method as recited in claim 1 further comprising the step of printing a flat image on at least part of the raised image printed on the textile substrate.

8. A method as recited in claim 7 further comprising the step of heat curing the raised image on the textile substrate before printing the flat image on the raised image.

9. A method as recited in claim 1 wherein the part of the raised image recited in claim 1 is a first raised level and the print processing station recited in step a) of claim 1 as a first print processing station, and the method further comprises the steps of:

g) providing a print screen and a stencil attached to a print side of the print screen at a second print processing station, wherein the print screen at the second print processing station is coated with an emulsion that is hardened except in one or more image areas, the stencil attached to the print screen at the second print processing station has a thickness and one or more image openings therethrough having a shape corresponding to the one or more image areas through the hardened emulsion coating on the associated print screen, the one or more image openings through the stencil defining one or more three-dimensional image volumes, the one or more image areas through the print screen at the second print processing station forming one or more images that is different than the one or more images formed through the print screen at the first print processing station;

h) after the first raised level is printed on the textile substrate, positioning the palette with the textile substrate at the second print processing station; and i) screen printing a pigmented paste onto the first raised level through the one or more image areas of the print screen at the second print processing station and the one or more image volumes of the stencil attached to the print screen at the second print processing station to form another part of the raised image on the textile substrate.

10. A method as recited in claim 9 wherein the first raised image level is heat cured before the second raised image level is printed thereon.

11. A method as recited in claim 1 wherein the emulsion coated on the print screen is a pure polymer emulsion and the pre-fabricated thick film stencil is a pure polymer material compatible with the pure polymer emulsion.

12. A method as recited in claim 11 further comprising the step of providing a ramp adjacent the stencil to the print side of the print screen, the ramp facilitating smooth application of a print squeegee over the print screen and stencil in the vicinity of the one or image volumes.

13. A method as recited in claim 1 wherein the step of screen printing a pigmented paste onto the textile substrate is accomplished using two opposing squeegees each mounted on a print head which moves to create the flood and print stroke for the respective print processing station.

14. A method as recited in claim 13 wherein the two squeegees are tilted towards one another such that the top ends of the squeegees are closer to each other than the bottom ends of the squeegees.

15. A method as recited in claim 13 wherein the bottom longitudinal edge of each squeegee is beveled to increase exposure of the bottom longitudinal edge to the print screen.

16. A method as recited in claim 1 wherein the step of screen printing pigmented paste onto the textile substrate involves the use of at least one squeegee having a bottom longitudinal edge that is beveled at least in part to increase exposure of the bottom longitudinal edge to the print screen.

17. A method as recited in claim 1 wherein the raised image is printed directly on the textile substrate.

18. A method as recited in claim 1 wherein a flat image is printed directly on a surface of the textile substrate, and the raised image is printed at least in part over the flat image.

19. A method as recited in claim 1 wherein the recited raised image is a first raised image printed on the textile substrate and the method further comprises the steps of:

g) providing a print screen and a stencil attached to a print side of the print screen at a second print processing station, wherein the print screen at the second print processing station is coated with an emulsion that is hardened or a block-out coating except in one or more image areas, the stencil attached to the print screen at the second print processing station has a thickness and one or more image openings therethrough having a shape generally corresponding to the one or more image areas through the hardened emulsion coating on the print screen at the second print processing station and the one or more image areas through the hardened emulsion coating on the print screen at the first print processing station, the one or more image openings through the stencil at the second print processing station which correspond to the one or more image areas through the hardened emulsion coating on the print screen at the first print processing station defining one or more three-dimensional volumes for accommodating the previously printed first raised image, and the one or more image openings through the stencil corresponding to the one or more image areas through the print screen at the second print processing station defining one or more three-dimensional image volumes for printing a second raised image on the textile substrate in the vicinity of the first raised image;

h) after the first raised image is printed on the textile substrate, positioning the palette with the substrate at the second print processing station; and i) screen printing a pigmented paste onto the textile substrate through the one or more image areas of the print screen at the second print processing station and the one or more associated image volumes of the stencil attached to the print screen at the second print processing station to form the second raised image on the textile substrate, wherein the color of the pigmented paste for the second raised image is different than the color of the pigmented paste for the first raised image.

20. A method as recited in claim 19 wherein the one or more three-dimensional volumes in the stencil at the second print processing station corresponding to the one or more image openings through the hardened emulsion coating on the print screen at the first print processing station are enlarged slightly to provide clearance when accommodating the previously printed first raised image at the second print processing station.

21. A method as recited in claim 19 wherein both the first and second raised images are printed directly on the textile substrate.

22. A method as recited in claim 19 wherein one or more flat images are printed directly on the surface of the textile substrate, and at least one of the first or second raised images is printed at least in part over the one or more flat images.

23. A method as recited in claim 19 wherein one or more raised images are printed directly on the surface of the textile substrate, and at least one of the first raised images printed at the first print processing station or the second raised image printed at the second print processing station is printed at least in part on one or more of the raised images printed directly on the surface of the substrate.

24. In an automatically indexing screen printing machine having a plurality of print processing stations and a plurality of movable palettes on which a printable textile substrate is placed, a method of printing a raised three-dimensional image on the textile substrate comprising the steps of:

a) providing a print screen at a first print processing station;

b) attaching a stencil to a print side of the print screen at the first print processing station, wherein the stencil is a pre-fabricated thick film having a precision controlled thickness;

c) coating the print screen at the first print processing station with an emulsion that is hardened except in one or more image areas, wherein the stencil has one or more image openings therethrough having a shape corresponding to the one or more image areas through the hardened emulsion coating on the print screen, and the one or more image openings through the stencil define one or more three-dimensional image volumes;

d) placing a textile substrate on a palette;

e) positioning the palette with the textile substrate placed thereon at the print processing station identified in step a); and f) screen printing a pigmented paste onto the textile substrate through the one or more image areas of the print screen and the one or more image volumes of the stencil to form a first raised image level on the textile substrate;

g) providing a print screen at a second print processing station;

h) attaching a stencil to a print side of the print screen at the second print processing station, wherein the stencil is a pre-fabricated thick film having a precision controlled thickness;

i) coating the print screen at the second print processing station with an emulsion that is hardened except in one or more image areas, wherein the stencil attached to the print screen at the second print processing station has one or more image openings therethrough having a shape corresponding to the one or more image areas through the hardened emulsion coating on the associated print screen, and the one or more image openings through the stencil define one or more three-dimensional image volumes, the thickness of the stencil at the second print processing station being greater than the thickness of the stencil at the first print processing station, and the one or more image areas through the respective print screens being substantially identical to one another;

j) after the first raised image level is printed on the substrate, positioning the palette with the substrate at the print processing station identified in step g), said first raised image level being placed in registration with the one or more image volumes on the stencil at the print processing station identified in step g; and k) screen printing a pigmented paste onto the first level of the raised image through the one or more image areas of the print screen at the second print processing station and the one or more image volumes of the stencil attached to the print screen at the second print processing station to form a second level of the raised image on the substrate, the thickness of the entire raised image being at least 300 microns.

25. A method as recited in claim 24 wherein the part of the raised image on the textile substrate printed through the print screen and stencil at the first print processing station is heat cured before printing the other part of the raised image through the print screen and attached stencil at the second print processing station.

26. In an automatically indexing screen printing machine having a plurality of print processing stations and a plurality of movable palettes on which a printable textile substrate is placed, a method of printing a raised three-dimensional image on the textile substrate comprising the steps of:

a) providing a print screen at a first print processing station;

b) attaching a stencil to a print side of the print screen wherein the stencil is a pre-fabricated thick film having a precision controlled thickness;

c) coating the print screen with an emulsion that is hardened except in one or more image areas, wherein the stencil has one or more image openings therethrough having a shape corresponding to the one or more image areas through the hardened emulsion coating on the print screen, and the one or more image openings through the stencil define one or more three-dimensional image volumes;

d) placing a textile substrate on a palette;

e) positioning the palette with the textile substrate placed thereon at the print processing station identified in step a); and f) screen printing a pigmented paste onto the textile substrate through the one or more image areas of the print screen and the one or more image volumes of the stencil to form at least part of the raised three-dimensional image on the textile substrate, the raised three-dimensional image having a top surface that is planar and peripheral edges that are substantially perpendicular to the top surface.

27. A method as recited in claim 26 further comprising the step of mixing at least polyvinyl chloride resin based ink, a releasing agent and dry thickener to make the pigmented paste.

28. A method as recited in claim 26 further comprising the steps of:

mixing puffing agent into the pigmented paste before screen printing the pigmented paste onto the textile substrate, the puffing agent being less than 20 percent by weight of the mixture of pigmented paste and puffing agent.

29. A method as recited in claim 26 further comprising the step of cooling the pigmented paste and the print screen and stencil as the automatically indexing screen printing machine operates over time.

30. A method as recited in claim 26 wherein the emulsion coated on the print screen is a pure polymer emulsion and the stencil is a pure polymer material compatible with the pure polymer emulsion.

31. A method as recited in claim 26 wherein the recited raised image is a first raised image printed on the textile substrate and the method further comprises the steps of:

g) providing a print screen at a second print processing station;

h) attaching a stencil to a print side of the print screen at the second print processing station, wherein the stencil is a pre-fabricated thick film having a precision controlled thickness;

i) coating the print screen at the second print processing station with an emulsion that is hardened or a block-out coating except in one or more image areas, wherein the stencil attached to the print screen at the second print processing station has a thickness and one or more image openings therethrough having a shape generally corresponding to the one or more image areas through the hardened emulsion coating on the print screen at the second print processing station and the one or more image areas through the hardened emulsion coating on the print screen at the first print processing station, the one or more image openings through the stencil at the second print processing station which correspond to the one or more image areas through the hardened emulsion coating on the print screen at the first print processing station defining one or more three-dimensional volumes for accommodating the previously printed first raised image, and the one or more image openings through the stencil corresponding to the one or more image areas through the print screen at the second print processing station defining one or more three-dimensional image volumes for printing a second raised image on the textile substrate in the vicinity of the first raised image;

j) after the first raised image is printed on the textile substrate, positioning the palette with the substrate at the second print processing station; and k) screen printing a pigmented paste onto the textile substrate through the one or more image areas of the print screen at the second print processing station and the one or more associated image volumes of the stencil attached to the print screen at the second print processing station to form the second raised image on the textile substrate, wherein the color of the pigmented paste for the second raised image is different than the color of the pigmented paste for the first raised image.

32. A method as recited in claim 31 wherein the one or more three-dimensional volumes in the stencil at the second print processing station corresponding to the one or more image openings through the hardened emulsion coating on the print screen at the first print processing station are enlarged slightly to provide clearance when accommodating the previously printed first raised image at the second print processing station.

33. A method as recited in claim 31 wherein both the first and second raised images are printed directly on the textile substrate.

34. A method as recited in claim 31 wherein one or more flat images are printed directly on the surface of the textile substrate, and at least one of the first or second raised images is printed at least in part over the one or more flat images.

35. A method as recited in claim 31 wherein one or more raised images are printed directly on the surface of the textile substrate, and at least one of the first raised images printed at the first print processing station or the second raised image printed at the second print processing station is printed at least in part on one or more of the raised images printed directly on the surface of the substrate.

* * * * *